Dec. 29, 1970  L. J. CREVISTON ET AL  3,550,302
AUTOMATIC MOTION LURE AND ALERT FOR FISHING LINES
Filed Sept. 17, 1968  3 Sheets-Sheet 1

Leo J. Creviston
Arthur G. Johnson
INVENTORS

BY Clarence A. O'Brien
and Harvey B. Jacobson
Attorneys

Dec. 29, 1970  L. J. CREVISTON ET AL  3,550,302
AUTOMATIC MOTION LURE AND ALERT FOR FISHING LINES
Filed Sept. 17, 1968  3 Sheets-Sheet 2

Leo J. Creviston
Arthur G. Johnson
INVENTORS

Dec. 29, 1970        L. J. CREVISTON ET AL        3,550,302
AUTOMATIC MOTION LURE AND ALERT FOR FISHING LINES
Filed Sept. 17, 1968                    3 Sheets-Sheet 3
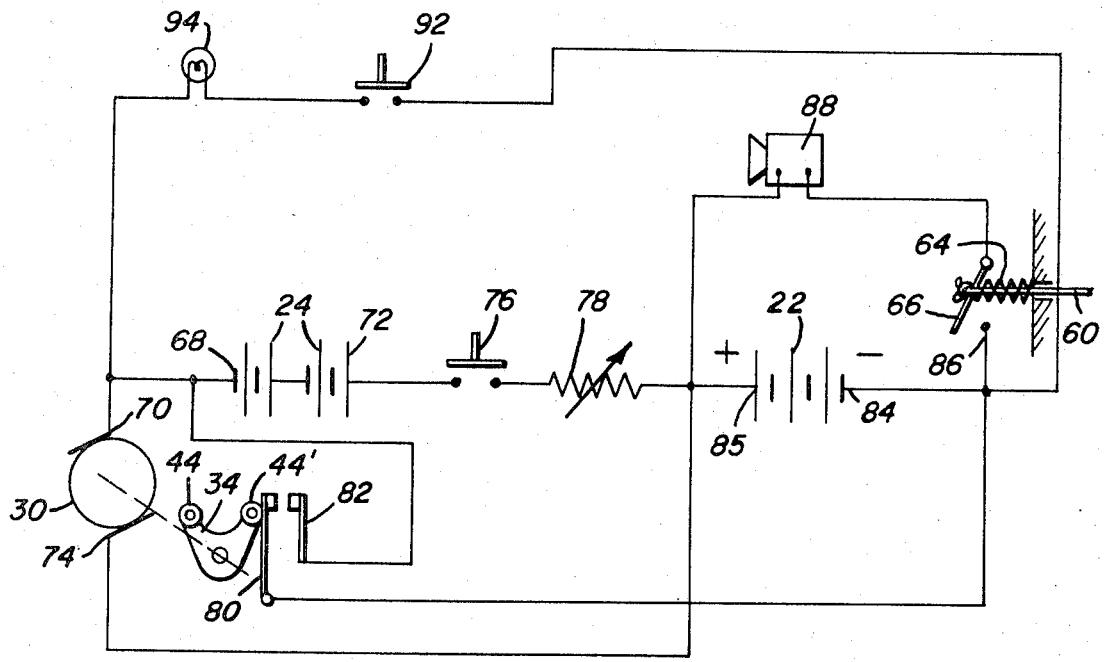
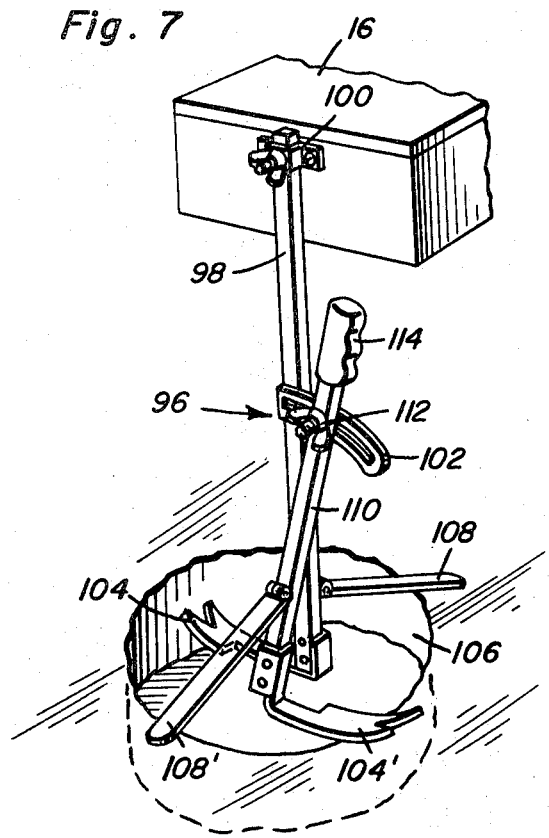
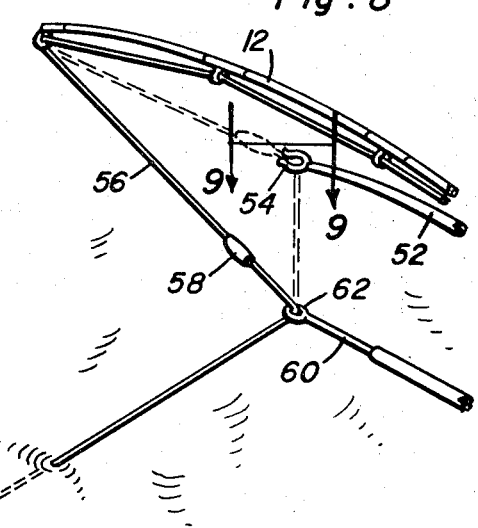
Leo J. Creviston
Arthur G. Johnson
INVENTORS

United States Patent Office 3,550,302
Patented Dec. 29, 1970

3,550,302
AUTOMATIC MOTION LURE AND ALERT FOR FISHING LINES
Leo J. Creviston, 711 Lakeview Drive, and Arthur G. Johnson, 919 E. Main St., both of Warsaw, Ind. 46580
Filed Sept. 17, 1968, Ser. No. 760,152
Int. Cl. A01k 97/12
U.S. Cl. 43—16                                                  8 Claims

ABSTRACT OF THE DISCLOSURE

A fishing apparatus comprising a device for imparting periodic jerking movement to a fishing line and having an alarm mechanism for alerting the fisherman to the bite of a fish. A fishing pole is mounted on a housing from which a motor-driven lever arm extends outwardly below the said pole. The outer end of the lever arm releasably engages the fishing line and the inner end of the arm has a cam surface engaged by a rotating cam with dual lobes thereon causing jerking oscillations of the lever arm, which oscillations are translated to the fishing line. When a fish bites, the line is pulled free of the lever arm in a manner to actuate the alarm mechanism.

---

The present invention relates to fishing apparatus, and more particularly to a device for imparting motion to a fishing line and causing an alarm when a fish bites.

In the past, automatic fishing devices have been designed which cause vertical movement of a submerged fish lure in an attempt to urge a fish to bite. However, the periodic unnatural motion of the bait which develops from such a device does not satisfactorily simulate the motion of a live fish bait to which other prey fish are attracted. Certain other prior art devices cause a fishing pole to pivot rearwardly after a fish bites so that a line hook may be satisfactorily attached to the fish. Although these devices may be of some use after a fish is caught, it does not provide an automatic means for luring the fish to the hook.

The present invention includes a fishing line agitator apparatus for automatically catching and retrieving a caught fish. First, the present invention includes a motion-imparting device which causes the fishing line to periodically jerk in an irregular manner thereby successfully simulating natural fish motion. Further, when a fish bites, a line-monitoring device causes an alarm to sound thereby alerting the fisherman. If a manual reel is mounted up on the fishing pole, the actuation of the alarm permits the fisherman to manually reel in his catch. On the other hand, if a spring-loaded reel assembly is provided with the fishing pole, once the fish has bitten, the reel automatically retrieves the fish from the water. Thus, the present invention offers the fisherman both manual and automatic flexibility in fish retrieval. As will be appreciated, the device for imparting motion to the fishing line obviates the necessity for the fisherman to spend a tedious period of time in-between catches. Means are also provided in the present invention for mounting a fishing pole to a boat. Alternately, a tripod type ice clamp may be utilized to permit automatic ice fishing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 6 is an electrical schematic diagram of the control circuitry utilized in the present invention.

FIG. 7 is a perspective view of an ice clamp for supporting the automatic fishing device of the present invention.

FIG. 8 is a perspective view illustrating the apparatus under a fish bite condition.

Figure 1:
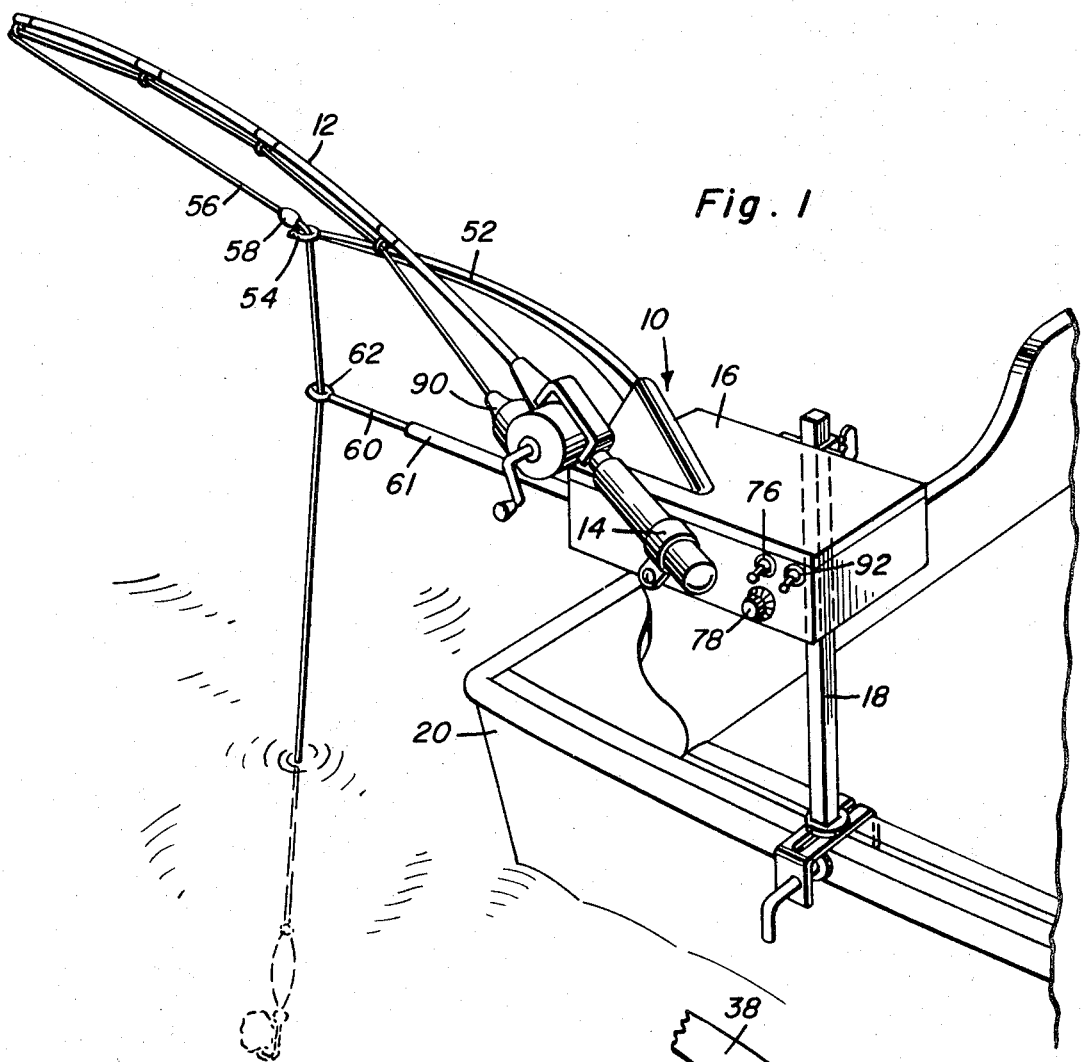
FIG. 1 is a perspective view illustrating the present invention mounted on a fisherman's boat.

Referring specifically to the drawings and more particularly to FIG. 1 thereof, reference numeral 10 generally denotes the present invention to which is attached a conventional fishing pole 12 by means of a clamp 14 engaged around the handle of the fishing rod, the clamp being fastened to a side of housing 16. The housing encloses components for controlling motion of the fishing line as hereinafter explained. An upright mounting post 18 is conveniently clamped to the rear of a fisherman's boat 20 to support the housing.

Figure 2:
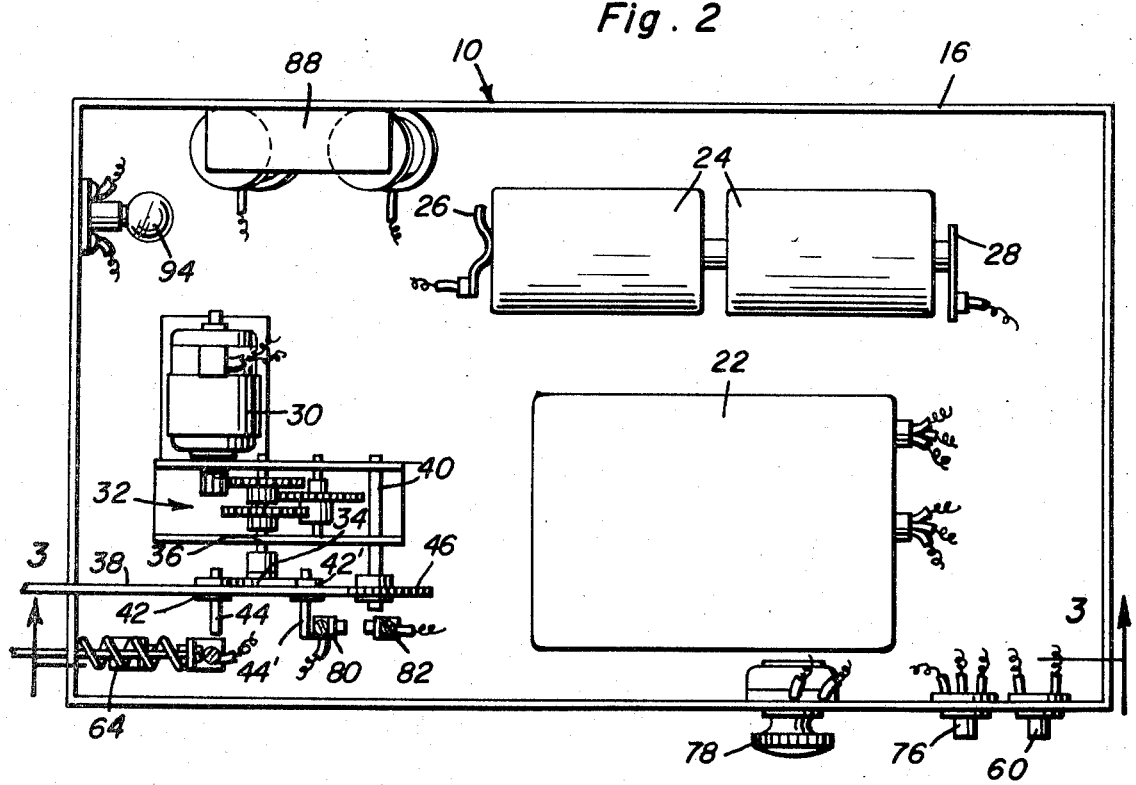
FIG. 2 is a top plan view illustrating the component parts enclosed within a housing of the present invention with the cover removed.

Referring to FIG. 2, the components disposed inwardly of housing 16 include a 6-volt battery 22 suitably clamped to the housing. A second battery comprised of two 1.5 volt batteries 24 retained between battery clamps 26 and 28 provides a second source of D.C. voltage, the invention utilizing both the battery sources 22 and 24 as herein described. The mechanism for imparting motion to the fishing line includes a D.C. motor 30 suitably clamped to housing 16, the output shaft of the motor being coupled to a suitable reduction gear train generally denoted by 32. The output of the gear train is attached to a rotating shaft 36 which mounts a generally V-shaped cam actuator 34, the central body portion of the actuator being mounted upon shaft 36. The structure of the cam actuator is more particularly illustrated in FIGS. 4 and 5 wherein it is seen to include angularly spaced arms having round roller members 42 and 42' mounted thereon. The roller members are axially disposed upon outwardly-extending pin members 44 and 44' carried by the cam actuator. The aforementioned roller members are adapted to displace elongated cam 38 having a lower portion thereof pivotally mounted upon stationary shaft 40. The cam 38 includes a rounded end portion 46 through which shaft 40 passes and is generally upwardly inclined and has an arcuate indentation 48 immediately adjacent the rounded end 46. The indentation 48 is disposed immediately adjacent an arcuate projection 50 which generally extends in spaced relation to arcuate end 46. The upwardly-inclined end portion of cam 38 is characterized as a lever or arm 52 having an arcuately-formed releasably guide element 54 having clamping ends at the outward end as more particularly seen in FIG. 9 which encircles fishing line 56. As will be noted in FIG. 1, a bulb element 58 is attached to line 56 and is positioned immediately above guide element 54. In operation of the device, when a fish bites, line 56 is pulled downwardly causing bulb member 58 to spread the clamping ends of guide element 54 thereby forcing fishing line 56 out of the guide element 54 as shown by dotted line in FIG. 9.

Figure 4:
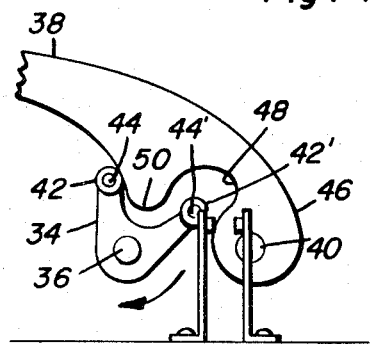
FIG. 4 is a partial front elevational view showing the fishing line jerking mechanism in a first position.
Figure 5:
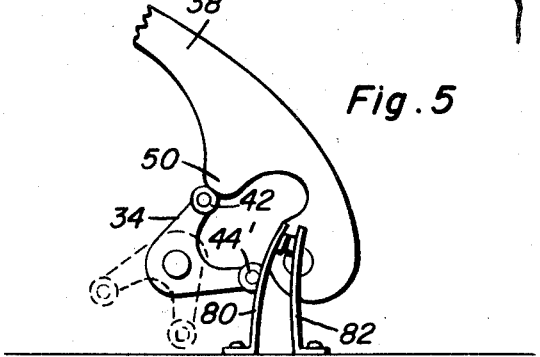
FIG. 5 is a view similar to that of FIG. 4 with the mechanism being shown in a second position.

In normal utilization of the present invention, when the fishing line is payed out, periodic jerking motion is imparted to line 56 by virtue of oscillatory motion of arm 52. This jerking motion is generated by cam actuator 34 as seen in FIGS. 4 and 5. As will be noted from these views, cam projection or lobe 50 is sequentially engaged by roller members 42 and 42' during rotation of the cam actuator 34 to cause oscillation of cam 38 and integrally-attached bow portion 52 through two strokes during each revolution of the cam due to the spacing between rollers 42 and 42'.

Reference is made to FIG. 4 which illustrates cam lobe 50 retracted between roller members 42 and 42' and FIG. 5 showing upward displacement of cam 38. Following contact between roller 42 and lobe 50, cam 38 and arm 52 connected thereto pivot downwardly under the downward drag of the fishing line. FIG. 5 further illustrates in phantom the disposition of cam actuator 34 during a dwell period when the cam 38 is disengaged.

Figure 3:
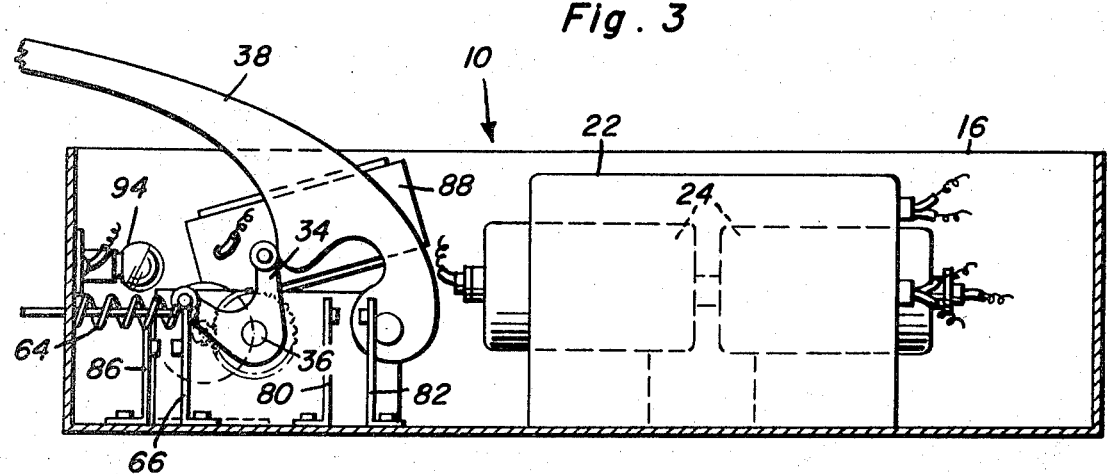
FIG. 3 is a side sectional view taken substantially through a plane indicated by section line 3—3 in FIG. 2.

Again referring to FIG. 1, an arm 60 extending outwardly of a guide tube 61 from the housing 16, in underlying spaced relation to arm 52, includes a loop element 62 at the end thereof. It will be seen that the loop element is disposed in substantial underlying aligned relation to clamp element 54 of arm 52. The opposite end of arm 60 which extends inwardly of housing 16 for attachment to a flexibly yieldable electrical switch contact 66 as shown in FIG. 3, is disposed perpendicularly to the contact. A return spring 64 is axially mounted upon arm 60 between the interior wall surface of the housing and contact 66 through which arm 60 passes urging switch contact 66 away from the aforementioned housing wall and stationary contact 86. Movable switch contact 80 is also mounted in the housing for engagement by the pins 44 and 44' of the cam actuator, closely spaced from stationary contact 82.

In order to more fully understand the operation of the present invention, the electrical control circuitry is illustrated in FIG. 6. The negative terminal 68 of battery pack 24 is connected to a first electrical input terminal 70 of motor 30. The positive terminal 72 of the battery pack 24 is connected to a second motor input terminal 74 through an on-off switch 76 serially connected with a variable resistor 78. Thus, once switch 76 is closed, motor 30 is placed into operation causing rotation of cam actuator 34. Variable resistor 78 is utilized for controlling motor input current which in turn permits motor speed control at a corresponding rotational speed of the cam actuator. Referring to FIGS. 4 and 5, pin extensions 44 and 44', axially extending from respective roller members 42 and 42', cause periodic displacement of movable switch contact 80 associated with stationary positioned switch contact 82. This action is depicted in FIG. 5. The closing of switch contacts 80 and 82 occurs simultaneously with the engagement of cam actuator 34 and cam 38 causing an increase in the load upon motor 30. Thus, the motor input voltage is increased through switch 80-82 so that proper cam actuator rotation and torque may be maintained. This is accomplished by the connection of switch contact 82 to the electrical input terminal 70 of motor 30. Also, the 6-volt battery 22 including a negative terminal 84 is directly connected to the second switch contact 80. The positive terminal 85 is permanently connected to motor input terminal 74 so that closure of contacts 80 and 82 impress the voltage of 6-volt battery 22 across the electrical input terminals of motor 30. As will be appreciated, when cam actuator 34 disengages cam 38, the additional voltage of battery 22 is no longer needed. Cam actuator 34 causes disconnection of the battery 22 by terminating engagement between roller pins 44 or 44' and switch contact 80, thereby breaking the previously established connection battery 22 and motor 30 until the next cycle.

Figure 9:
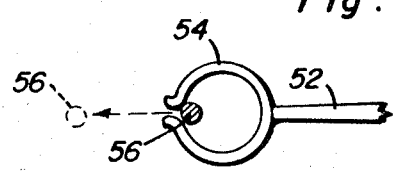
FIG. 9 is a detail view of the means immediately imparting motion to the fishing line.

Referring to FIG. 1, in normal operation of the present invention, line 56 is cyclically jerked by virtue of the periodic oscillation of arm 52 caused by the previously discussed cam actuator and cam combination. At such time when a fish bites, line 56 is pulled downwardly causing bulb member 58 to spread the arms of guide element 54 apart thereby freeing line 56 from encircling engagement with the contact element as shown in FIG. 9. Therefore, once a fish bites, motion of arm 52 no longer has an effect on the line. However, the fish bite will cause the outward displacement of arm 60 against the bias of spring 64 which in turn causes the closing of switch contacts 66 and 86 as seen in FIG. 3. In order to alert the fisherman of his catch, an alarm system is actuated by the closing of contacts 66 and 86. As shown in FIG. 6, the electrical input terminals of a suitable, conventional alarm 88 such as a buzzer, bell, siren or the like are connected across the terminals of battery 22 through switch contacts 66 and 86. The fish bite is detected by spring-loaded arm 60 which in turn causes closing of contacts 66 and 86 to complete the circuit through alarm 88 for alerting the fisherman.

Referring to FIG. 1, reel 90 may be a conventional manual type which permits the fisherman to reel in his catch after being alerted of a fish bite. However, it is contemplated that completely automatic fishing may be obtained by utilizing a spring-loaded reel 90, known in the art, which includes a latch mechanism for automatically reeling in a fish after the fish has exerted a pull on line 56.

When heavier equipment requires continual application of voltage from the 6-volt battery supply 22 to the input of motor 30, a separate on-off switch 92 is provided which may be characterized as a single pole-single throw switch. The first pole is connected to one electrical input terminal of motor 30 through a serially connected indicator lamp 94 which becomes energized when switch 92 is depressed. The second contact of switch 92 is connected to the negative terminal 84 of D.C. battery supply 22. As previously mentioned, the second motor input terminal is permanently connected to the positive terminal of battery 22 so that depression of switch 92 causes continuous application of 6-volts from battery source 22 across input terminals of motor 30.

Although the aforementioned description relates to utilization of the present invention in association with a fishing boat 20, it is contemplated that the present invention may be satisfactorily employed during ice fishing. Referring to FIG. 7, a tripod type assembly or ice clamp 96 is shown to include a vertically-positioned post 98 adjustably attached to a monitor housing 16 by a thumbscrew assembly 100. A fishing pole (not shown) is attached to the monitor housing as in FIG. 1 and is periodically jerked as previously discussed. An arcuate slotted guide member 102 extends laterally from post 98 for purposes to become hereinafter apparent. The lower end portion of post 98 includes a dual-tined prong member 104 which is placed in engagement with the underside of an iced surface in which a hole 106 has been formed. A second elongated lever member 110 is positioned in juxtaposition with guide member 102, the lever being adjustably fixed in relation to the guide by means of thumbscrew assembly 112. The lower end portion of the lever includes a prong member 104' identical to previously mentioned prong member 104. A pair of braces 108 and 108' are hinged to the post and the lever 110 for engagement with the top surface of the ice on opposite lateral sides of the post and lever.

To use the clamp 96, lever member 110 is positioned in parallel relation with post 98 permitting easy insertion of ice clamp 96 through a hole formed in ice. The pivotally supported brace members 108 and 108' are permitted to rest against the upper surface of the ice and a handle 114 on the upper end of lever member 110 is pushed outwardly along the length of guide member 102 until prong member 104' engages the undersurface of the ice adjacent the periphery of hole 106. The wing nut 112 is then tightened. As a result, the ice clamp 96 is securely held in position supporting housing 16 by virtue of the underlying contact of prong members 104 and 104' as well as the engagement of brace members 108 and 108' with the upper portion of the ice immediately adjacent the periphery of hole 106.

Although the present invention has been described in terms of an electrically driven apparatus, it will be noted that the electrical components shown in FIG. 2 and FIG. 3 may be replaced with a conventional spring-driven device. To effect such mechanical operation, a hand crank or winding key would extend inwardly from housing 16. The inward end of such an actuator would be disposed in approximately the same position as electrical motor 30 as shown in FIG. 2. Of course, the gear train 32 may be modified or eliminated depending upon the spring-driven device utilized. Thus, the spring-driven device would be connected to shaft 36 mounting cam member 34. In operation of such a device, the hand actuator is rotated until the spring device is fully wound. The cam will cause operation of the device in accordance with the aforementioned description. Periodically, as the spring device "runs down," it is rewound to permit recycling. The particular advantage of a mechanically-driven device as opposed to an electrically-driven device, fully explained hereinbefore, resides in fabrication economy as well as lower operating costs due to the omission of expandable batteries.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fishing apparatus having a fixedly mounted fishing pole and a reel mounted thereon comprising, an elongated lever having guide means releasably engaging a line extending from the reel, means associated with said lever for periodically jerking said line, sensing means rendered operative by release of the line from the guide means in response to a fish bite, and alarm means actuated by said sensing means when detecting a fish bite, said means for periodically jerking the line comprising a rotating cam actuator mounted within a housing, means pivotally mounting said lever within the housing and a cam surface on the lever periodically contacted by said actuator, said lever being oscillated in response to the urging of said actuator, motor means, coupling means connecting said motor means to said cam actuator causing the latter to rotate, first and second voltage sources, means for normally connecting said first voltage source to the input of said motor, automatically actuatable switch means for connecting said second voltage source to the input of said motor for increasing the load capability of said motor during movement of the lever, actuation of said automatically actuated switch means occurring only during contact between said cam actuator and said cam surface.

2. An ice clamp for mounting a fishing line monitor housing, the clamp comprising a post having top and bottom end portions thereon, means for attaching a fishing line monitor housing to said top end portion, first prong means attached to said bottom end portion for engaging the underside ice surface adjacent a hole formed in the ice, an elongated lever disposed adjacent said post in adjusted angular relation thereto, second prong means attached to the bottom of said lever for engaging the underside ice surface, and brace means connected to said lever and said post for engagement with the upper ice surface adjacent said hole formed in the ice thereby holding the post upright.

3. The combination of claim 2 including a fishing pole connected to the monitor housing, a line extending from the fishing pole, an arm mounted on said housing having guide means releasably engaging the line and alarm means in said housing responsive to disengagement of the line from the guide means by a fish bite for producing an alerting signal.

4. The combination of claim 3 including means for oscillating the guide means to periodically jerk the line when engaged by the guide means.

5. In combination with a fishing pole and a fishing line extending therefrom, a motion lure and sensing device comprising a sensing element through which the line extends downwardly, a guide member engaging the line in vertically spaced relation above the sensing element for preventing the line from exerting a force on the sensing element when tensioned below a predetermined limit, said guide member having means releasing the line when tensioned in excess of said predetermined limit to permit actuation of the sensing element by said force, motion imparting means operatively connected to the guide member for transmitting oscillatory motion to the line when engaged with the guide member and alarm means operated in response to said actuation of the sensing element, said motion imparting means including a motor, an actuator driven by the motor having at least two angularly spaced engaging arms and cam means mounted on the guide member for engagement by the engaging arms to produce at least two oscillatory strokes of the guide member of limited duration during each rotational cycle of the motor.

6. The combination of claim 5 including a pair of electrical sources of energy respectively energizing the motor and the alarm means, and switch means operated by the actuator for momentarily connecting both sources to the motor only while the guide member is undergoing said oscillatory motion.

7. A powered fishing line agitator comprising a lever having its free end engaging a fishing line, a cam follower surface integrally formed along an intermediate length of the lever, and a rotating multiple lobe camming means pisitioned adjacent the follower, the camming means periodically engaging the follower for causing oscillations in the lever during each period of camming means rotation, said oscillations being translated into irregular jerking motion of the line thereby simulating natural bait movements attached to the end of the line.

8. The structure if claim 7 wherein the camming means comprises a central portion keyed to a driving shaft and a pair of angularly offset arms extending outwardly from the central portion for riding along the cam follower surface.

References Cited

UNITED STATES PATENTS 2,643,478    6/1953    Paulsen _____ 43—19.2

FOREIGN PATENTS 389,542    3/1933    Great Britain _____ 43—16
1,399,668  4/1965    France _____ 43—16

SAMUEL KOREN, Primary Examiner

D. J. LEACH, Assistant Examiner

U.S. Cl. X.R.

4—19.2; 248—44, 158